United States Patent
Eum

(10) Patent No.: US 10,575,377 B2
(45) Date of Patent: Feb. 25, 2020

(54) LINE RIPPLE REDUCER

(71) Applicant: SEMICONDUCTOR COMPONENTS INDUSTRIES, LLC, Phoenix, AZ (US)

(72) Inventor: Hyunchul Eum, Gwangmyeong-si (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/128,650

(22) Filed: Sep. 12, 2018

(65) Prior Publication Data

US 2019/0159308 A1 May 23, 2019

Related U.S. Application Data

(60) Provisional application No. 62/589,737, filed on Nov. 22, 2017.

(51) Int. Cl.
  *H05B 33/08* (2006.01)
  *H05B 39/00* (2006.01)
  (Continued)

(52) U.S. Cl.
  CPC .......... *H05B 33/0815* (2013.01); *H02M 1/15* (2013.01); *H05B 33/0818* (2013.01);
  (Continued)

(58) Field of Classification Search
  CPC .......................... H05B 33/08; H05B 33/0815; H05B 33/0818; H05B 33/0845; H05B 39/00;
  (Continued)

(56) References Cited

U.S. PATENT DOCUMENTS 7,741,787 B2 * 6/2010 Chen .................. H02M 1/15
                                                315/224
7,750,616 B2 * 7/2010 Liu .................... H05B 33/0815
                                                323/224

(Continued)

OTHER PUBLICATIONS

JoulWatt Technology Inc., "Scalable Adapotive 100/120Hz Current Ripple Remover 350mA maximum input current," JW1210 datasheet, 2014.

*Primary Examiner* — Thai Pham

(74) *Attorney, Agent, or Firm* — AMPACC Law Group, PLLC

(57) ABSTRACT

A circuit includes a power supply circuit and a ripple reduction circuit. The power supply circuit supplies a Direct Current (DC) lighting current to a light emitting circuit. The lighting current has a ripple current at a ripple frequency. The ripple reduction circuit receives the lighting current, and performs, based on the received lighting current, Pulse Width Modulation (PWM) of the lighting current at a PWM frequency. The PWM frequency is higher than the ripple frequency. By performing the PWM, the ripple reduction current reduces variations in a magnitude of the lighting current at the ripple frequency. The PWM frequency may be higher than a frequency at which variations in the magnitude of the light produced by the lighting circuit have a harmful effect on the human eye.

20 Claims, 7 Drawing Sheets

(51) Int. Cl.
*H02M 1/15* (2006.01)
*H02M 1/00* (2006.01)
*H02M 1/42* (2007.01)

(52) U.S. Cl.
CPC ....... *H05B 33/0845* (2013.01); *H02M 1/4208* (2013.01); *H02M 2001/0009* (2013.01)

(58) Field of Classification Search
CPC ....... H05B 39/04; H05B 39/047; H02M 1/15; H02M 1/4208; H02M 2001/0009
See application file for complete search history.

(56) References Cited

U.S. PATENT DOCUMENTS

| | | | | |
|---|---|---|---|---|
| 2008/0018261 | A1* | 1/2008 | Kastner | F21V 23/00 315/192 |
| 2013/0093355 | A1* | 4/2013 | Han | H05B 33/0815 315/294 |
| 2014/0354186 | A1* | 12/2014 | Sun | H05B 33/0815 315/310 |
| 2015/0084527 | A1 | 3/2015 | Siu et al. | |

* cited by examiner

LINE RIPPLE REDUCER

CROSS-REFERENCES TO RELATED APPLICATIONS

The present invention claims the benefit of U.S. Provisional Application No. 62/589,737, filed Nov. 22, 2017, which is incorporated by reference herein for all purposes.

FIELD OF THE DISCLOSURE

The present disclosure relates generally to circuits and method for controlling power to electronic devices that emit visible light, such as Light Emitting Diodes (LEDs).

BACKGROUND

The present disclosure relates, in general, to electronics, and more particularly, to circuits and methods for controlling power to electronic devices that emit visible light, such as Light Emitting Diodes (LEDs), such as power produced from an Alternating Current (AC) power source.

Single-stage LED drivers use a single Switched Mode Power Supply (SMPS) circuit to convert an AC mains line voltage to a Direct Current (DC) voltage for one or more LEDs. The SMPS circuit may also provide Power Factor Correction (PFC). These SMPS circuit are typically designed for simplicity and low system cost.

One problem encountered by single-stage LED drivers is AC mains line ripple in the LED current. Even when the magnitude of the ripple on the voltage provided to the LEDs is small, the LED current ripple can be large due to the exponential V-I curve of an LED load.

The LED ripple current caused a corresponding variation in the magnitude of the light emitted by the LEDs. Even small fluctuations in the magnitude of illumination in a frequency range such as, for example, 5 Hz to 2000 Hz can be uncomfortable and/or harmful to the human eye. For the safety and comfort of the human eye, in the frequency range of 100 to 120 Hz at which the ripple current occurs (the second harmonic of the AC mains frequency), the magnitude of the LED current ripple should be less than, for example, 2% of the total LED current.

Technologies for reducing the LED ripple current of the related arts include using a second stage in the LED driver, wherein the second stage is a DC-to-DC SMPS circuit. However, adding a second SMPS circuit increases the Bill-Of-Materials (BOM) cost of the LED driver.

Other technologies for reducing the LED ripple current of the related arts include using constant-current a Low Drop Out (LDO) regulators in series with the LEDs. This is less expensive than adding a second SMPS circuit, but reduces the total system efficiency because of the headroom loss across the LDO regulator.

It would be advantageous to reduce the effect on the human eye of LED ripple currents in the 100-120 Hz range at a lower BOM cost than when using a second-stage SMPS circuit and at higher efficiencies than possible using a second stage LDO regulator.

BRIEF DESCRIPTION OF THE FIGURES

In the accompanying figures, like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1A:
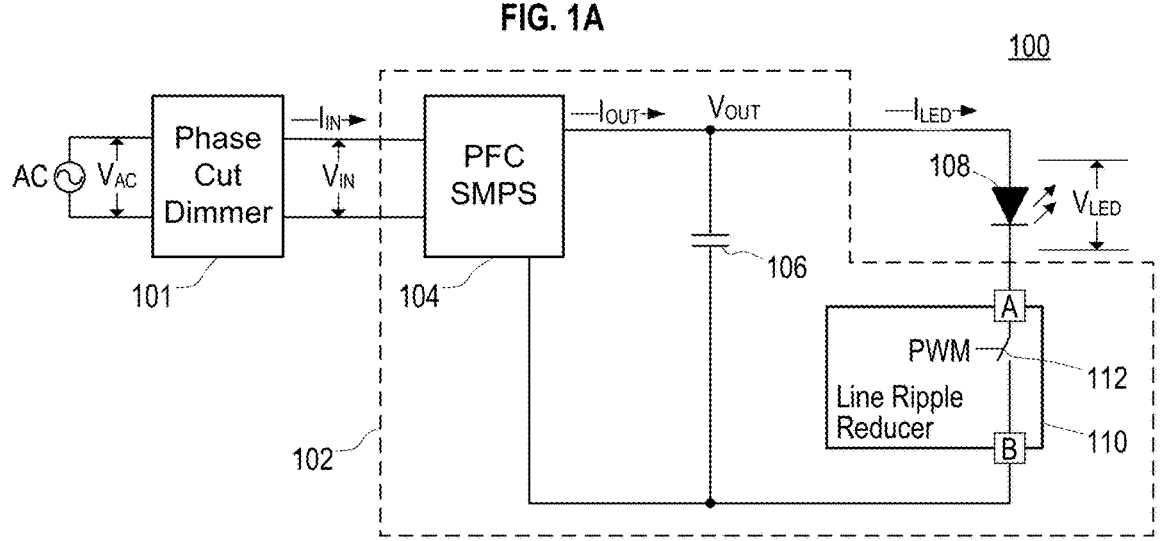
FIG. 1A illustrates an AC-powered LED lighting circuit according to an embodiment.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of the embodiments.

The apparatus and method components have been represented where appropriate by conventional symbols in the drawings, showing only those specific details that are pertinent to understanding the embodiments. This avoids obscuring the disclosure with details that will be readily apparent to those of ordinary skill in the art having the benefit of the disclosures herein. The details of well-known elements, structures, or processes that are necessary to practice the embodiments and that are well known to those of skill in the art may not be shown and should be assumed present unless otherwise indicated.

DETAILED DESCRIPTION

Embodiments relate generally to electronics, and more particularly, to Pulse Width Modulation (PWM) controllers including PWM controllers included in an integrated circuit.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

Embodiments operate to modulate a current at a high frequency to reduce the effect of a lower-frequency ripple current of the current. An illustrative embodiment may modulate a lighting current (such as a current through a visible-light LED) at a frequency of 2 KHz or more in order to reduce the effect of a 100 to 120 Hz ripple current on the human-perceived variation in the magnitude of visible light produced using the lighting current. Because the human eye is not negatively affected by light modulation at high frequencies, such as 2 KHz or more, embodiments may operate to reduce the effect on the human eye of LED ripple currents in the 100-120 Hz range with high efficiency and low BOM cost.

In an embodiment, a circuit comprise s a power supply circuit and a ripple reduction circuit. The power supply circuit is to supply a Direct Current (DC) lighting current to a light emitting circuit, the lighting current having a ripple current at a ripple frequency. The ripple reduction circuit is to receive the lighting current, and perform, based on the received lighting current, Pulse Width Modulation (PWM) of the lighting current at a PWM frequency to reduce variations in a magnitude of the lighting current at the ripple frequency by performing the PWM. the PWM frequency is higher than the ripple frequency.

The ripple reduction circuit may include a switching device to control the lighting current according to a PWM signal, a Current Sense (CS) circuit to produce a CS signal according to a magnitude of the lighting current, a CS integrator to generate, by integrating the CS signal over a duration, an integrated CS signal, and a PWM signal generation circuit to generate, according to a PWM clock signal and the integrated CS signal, the PWM signal.

FIG. 1A illustrates an AC-powered LED lighting circuit 100 according to an embodiment. The LED lighting circuit 100 includes a phase-cut dimmer 101 that provides an AC input voltage $V_{IN}$ to a Direct Alternating Current Drive (DACD) circuit 102. The DACD circuit 102 provides a Direct Current (DC) output voltage $V_{OUT}$ to an LED string 108, causing an LED current $I_{LED}$ to flow through the LED string 108. The LED string 108 includes one or more LEDs couple in series.

The DACD circuit 102 includes a first stage 104 that converts the input voltage $V_{IN}$ to the output voltage $V_{OUT}$ and an output capacitor 106. In the embodiment shown in FIG. 1A, the first stage 104 is a Switched Mode Power Supply (SMPS) that provides Power Fact Correction (PFC), but embodiments are not limited thereto.

The DACD circuit 102 also includes a ripple reduction circuit 110 coupled in series with the LED string 108. In the embodiment shown in FIG. 1A, the ripple reduction circuit 110 receives the LED current $I_{LED}$ as it returns from the LED string 108 to the DACD circuit 102, but embodiments are not limited thereto. In another embodiment, LED current $I_{LED}$ flows through the ripple reduction circuit 110 before being provide to the LED string 108.

The ripple reduction circuit 110 includes a switching device 112 controlled by a Pulse Width Modulated signal PWM. The Pulse Width Modulated signal PWM is controlled at a frequency higher than a frequency of a ripple current of the output voltage $V_{OUT}$ in order to reduce the effect of the ripple current on the human eye. For example, in an embodiment wherein the frequency of the ripple current is between 100 and 120 Hz, the Pulse Width Modulated signal PWM is controlled at a frequency of 2000 Hz or more.

In an embodiment, the ripple reduction circuit 110 controls a duty cycle of the Pulse Width Modulated signal PWM according to a target average current, and the target average current may be adjusted according to a minimum and/or maximum duty cycle of the Pulse Width Modulated signal PWM. In an embodiment that controls the duty cycle of the Pulse Width Modulated signal PWM so that an average current flowing through the LED string 108 for each cycle of the Pulse Width Modulated signal PWM is the same, because the magnitude of the illumination produced by the LED string 108 is proportional to the current through the LED string 108, the average magnitude of the illumination produced by the LED string 108 for each cycle of the Pulse Width Modulated signal PWM will be the same.

In an embodiment, the target average current may be decreased if the duty cycle of the Pulse Width Modulated signal PWM is limited by a predetermined upper threshold, and the target average current may be increased if the duty cycle of the Pulse Width Modulated signal PWM is limited by a predetermined lower threshold. For example, a predetermined upper threshold may be 90%. If conditions arise such that the PWM duty would have to be 95% in order to produce a present target average current, the target average current may be reduced to a value that can be obtained without the PWM duty exceeding the 90% upper threshold. In an illustrative embodiment, the upper threshold may be 100%, and the lower threshold may be 1%, but embodiments are not limited thereto.

In another embodiment, the target average current may be decreased if the maximum duty cycle of the Pulse Width Modulated signal PWM during a sampling period becomes equal to or greater than a predetermined upper threshold, and the target average current may be increased if the maximum duty cycle of the Pulse Width Modulated signal PWM during the sampling period becomes equal to or less than a predetermined lower threshold. In an illustrative embodiment, the upper threshold may be 100%, and the lower threshold may be 80%, but embodiments are not limited thereto.

In another embodiment, the target average current may be decreased if the minimum duty cycle of the Pulse Width Modulated signal PWM during a sampling period becomes equal to or greater than a predetermined upper threshold, and the target average current may be increased if the minimum duty cycle of the Pulse Width Modulated signal PWM during the sampling period becomes equal to or less than a predetermined lower threshold. In an illustrative embodiment, the upper threshold may be 60%, and the lower threshold may be 40%, but embodiments are not limited thereto.

In another embodiment, the ripple reduction circuit 110 controls a duty cycle of the Pulse Width Modulated signal PWM according to a target average current, and the target average current may be adjusted according to an average duty cycle of the Pulse Width Modulated signal PWM. In an illustrative embodiment, the target average current may be decreased if the average duty cycle of the Pulse Width Modulated signal PWM over a predetermined time interval becomes equal to or greater than a predetermined upper threshold, and the target average current may be increased if the average duty cycle of the Pulse Width Modulated signal PWM over a predetermined time interval becomes equal to or less than a predetermined lower threshold. In an illustrative embodiment, the predetermined upper threshold may be 80%, and the predetermined lower threshold may be 40%, but embodiments are not limited thereto. In an illustrative embodiment, whether to increase or decrease the target average current is determined by comparing the average duty cycle of the Pulse Width Modulated signal PWM to a predetermined PWM target threshold using a comparator having hysteresis.

Figure 1B:
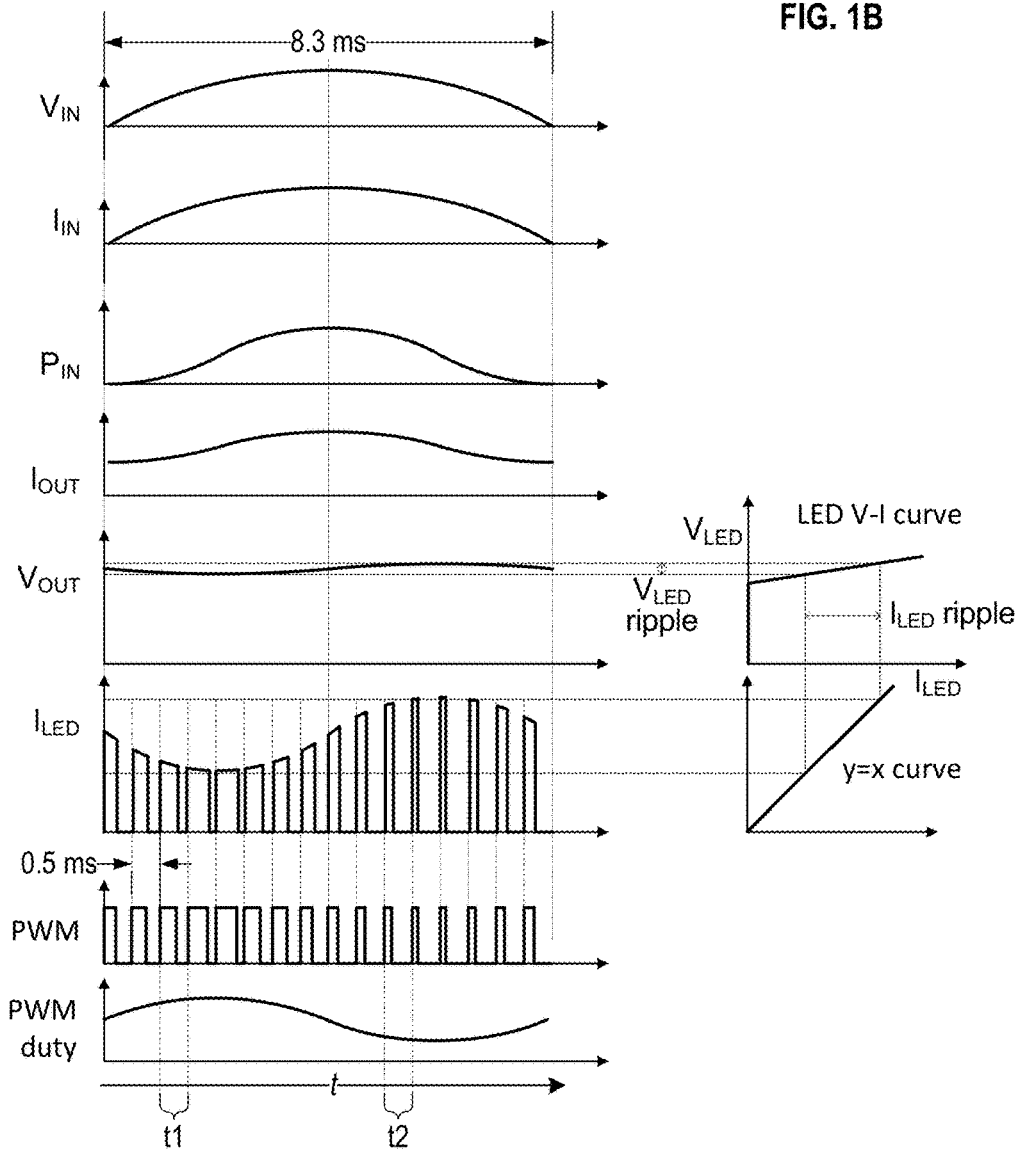
FIG. 1B illustrates signal waveforms during operation of the LED lighting circuit of FIG. 1A according to an embodiment.

FIG. 1B illustrates signal waveforms during operation of the LED lighting circuit of FIG. 1A according to an embodiment. The waveforms illustrated include the input voltage $V_{IN}$, an input current $I_{IN}$, an input power PIN, an output current $I_{OUT}$ of the first stage 104, the output voltage $V_{OUT}$, the LED current $I_{LED}$, and the Pulse Width Modulated signal PWM. FIG. 1B also illustrates values of a duty cycle of the Pulse Width Modulated signal PWM. FIG. 1B illustrates the signal waveforms over a duration corresponding to one half of a cycle of the input voltage $V_{IN}$, which in FIG. 1B corresponds to 8.3 milliseconds (ms) for a 60 Hz line frequency.

A ripple current is present in the output current $I_{OUT}$, which causes the output voltage $V_{OUT}$ across the output capacitor 106 to have a ripple voltage. Due to the exponential V-I curve of LED string 108, a large ripple current in the LED current $I_{LED}$ is produced (represented in FIG. 1B by the mapping of the ripple voltage in the output voltage $V_{OUT}$ to the LED V-I curve on the right, which is then reflected by an X=Y curve onto the LED current $I_{LED}$. The ripple reduction circuit 110 pulse-width modulates the LED current $I_{LED}$ using a PWM duty cycle according to an integral of the LED current $I_{LED}$ in order to produce an average LED current $I_{LED}$ that is substantially constant at frequencies that affect the human eye.

For example, for a first period t1 when the LED current $I_{LED}$ is lower than in a second period t2, the PWM duty of the PWM signal PWM will be higher than it is in the second period t2. As a result, a first integral of the LED current $I_{LED}$ during the time when the switching device 112 is on during the first period t1 is equal to a second integral of the LED current $I_{LED}$ during the period when the switching device 112 is on during the first period t2.

Figure 2:
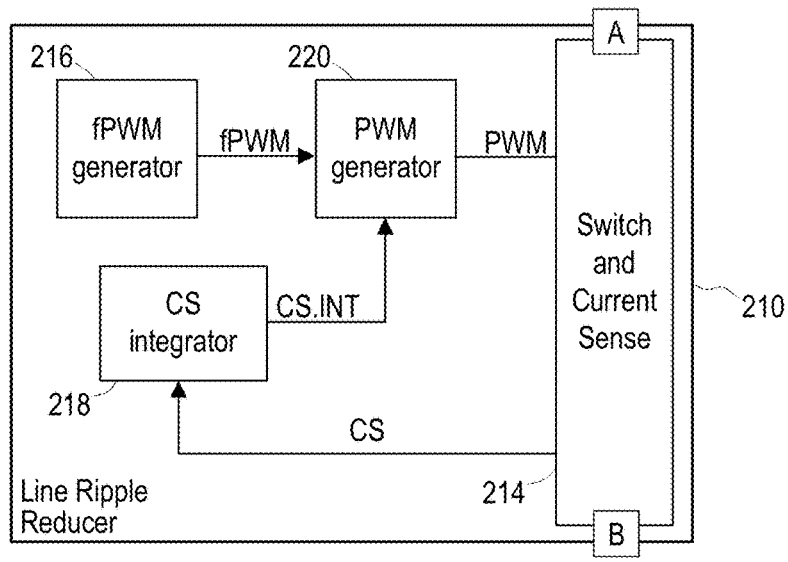
FIG. 2 illustrates a ripple reduction circuit according to an embodiment.

FIG. 2 illustrates a ripple reduction circuit 210 according to an embodiment. The ripple reduction circuit 210 is suitable for use in the ripple reduction circuit 110 of FIG. 1A, and includes a switch and current sense circuit 214, a current sense integrator circuit (hereinafter, CS integrator) 218, a PWM clock generator circuit 216, and a PWM signal generator circuit 220.

The switch and current sense circuit 214 is coupled between a first terminal A and a second terminal B, which correspond to the like-named terminals in FIG. 1A. The switch and current sense circuit 214 receives a Pulse Width Modulated signal PWM and produces a current sense signal CS.

The switch and current sense circuit 214 modulates a current flowing between the first and second terminals A and B according to the Pulse Width Modulated signal PWM, and produces the current sense signal CS according to the current flowing between the first and second terminals A and B. In an embodiment, a magnitude of a current of the current sense signal CS corresponds to a magnitude of the current flowing between the first and second terminals A and B. In another embodiment, a magnitude of a voltage of the current sense signal CS corresponds to the magnitude of the current flowing between the first and second terminals A and B.

The PWM clock generator circuit 216 generates a PWM clock signal fPWM. In an embodiment, a frequency of the PWM clock signal fPWM is 2000 Hz or more.

In an embodiment, a frequency of the PWM clock signal fPWM is determined according to a multiple of a frequency of the input voltage $V_{IN}$ of FIG. 1A, such as being 32 or 40 times the frequency of the input voltage $V_{IN}$. In an embodiment, a phase of the PWM clock signal fPWM is synchronized to a phase of the input voltage $V_{IN}$ in order to prevent a beat frequency between the PWM clock signal fPWM and the input voltage $V_{IN}$ from producing variations in the intensity of the light generated by a LED string.

The CS integrator 218 integrates a value of the current sense signal CS to produce an integrated CS signal CS.INT. In an embodiment, the CS integrator 218 integrates the value of the current sense signal while the PWM signal PWM is asserted, and resets the value of the integrated CS signal CS.INT to zero when the PWM signal PWM is de-asserted In an embodiment wherein the magnitude of the current of the current sense signal CS corresponds to the magnitude of the current flowing between the first and second terminals A and B, the CS integrator 218 integrates the value of the current of the current sense signal CS. In an embodiment wherein the magnitude of the voltage of the current sense signal CS corresponds to the magnitude of the current flowing between the first and second terminals A and B, the CS integrator 218 integrates the value of the voltage of the current sense signal CS.

The PWM signal generator circuit 220 generates the PWM signal PWM according to the PWM clock signal fPWM and the integrated CS signal CS.INT. In an embodiment, the PWM signal generator circuit 220 asserts the PWM signal in response to an assertion of the PWM clock signal fPWM, and de-asserts the PWM signal in response to the integrated CS signal CS.INT becoming equal to or greater than a threshold value.

Figure 3A:
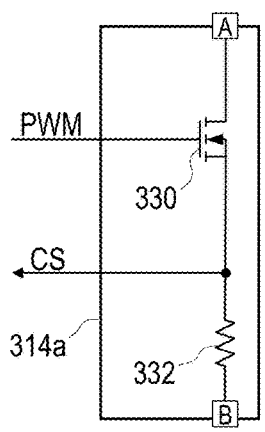
FIG. 3A illustrates a switch and current sense circuit according to an embodiment.

FIG. 3A illustrates a switch and current sense circuit 314a according to an embodiment. The switch and current sense circuit 314a is suitable for use in the switch and current sense circuit 214 of FIG. 2, and includes a MOSFET 330 and a current sense resistor 332.

The MOSFET 330 controls the current flowing between first terminal A and second terminal B. In an embodiment, the MOSFET 330 is operated as an on/off switch controlling whether current flows or not. In another embodiment, the MOSFET 330 may be operated to control the magnitude of the current flowing between the first terminal A and second terminal B by controlling a magnitude of a voltage of the PWM signal PWM when that signal asserted.

The current sense resistor 332 produces the current sense signal CS having a voltage magnitude, relative to a voltage at the second terminal B, proportional to the magnitude of the current flowing between the first terminal A and second terminal B.

Figure 3B:
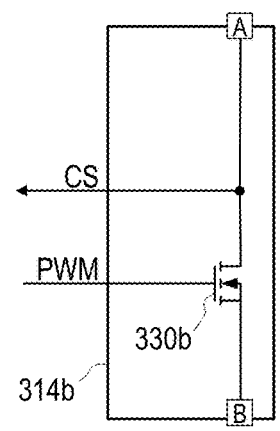
FIG. 3B illustrates a switch and current sense circuit according to another embodiment.

FIG. 3B illustrates a switch and current sense circuit 314b according to an embodiment. The switch and current sense circuit 314b is suitable for use in the switch and current sense circuit 214 of FIG. 2, and includes a MOSFET 330b that performs the function of both the MOSFET 330 and the current sense resistor 332 of FIG. 3A. That is, in the switch and current sense circuit 314b, an on resistance of the MOSFET 330b produces a voltage corresponding to the voltage produces across the current sense resistor 332 of FIG. 3A.

Figure 3C:
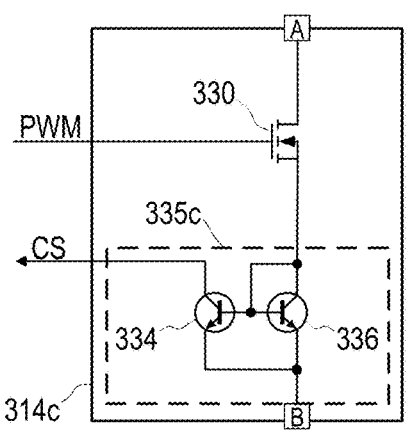
FIG. 3C illustrates a switch and current sense circuit according to another embodiment.

FIG. 3C illustrates a switch and current sense circuit 314c according to an embodiment. The switch and current sense circuit 314c is suitable for use in the switch and current sense circuit 214 of FIG. 2. The switch and current sense circuit 314c includes a MOSFET 330, a first mirror transistor 334, and a second mirror transistor 336.

The MOSFET 330 of FIG. 3C is operated as described for the MOSFET 330 of FIG. 3A and performs the same functions according to the embodiment described for FIG. 3A.

First and second mirror transistors 334 and 336 form a current mirror 335c. The current mirror 335c produces a current sense signal CS have a current having a magnitude proportional to a magnitude of the current flowing between the first terminal A and second terminal B. In an embodiment, first mirror transistor 334 is substantially identical to the second mirror transistor 336 and the magnitude of the current of the current sense signal CS is equal to the magnitude of the current flowing between the first terminal A and second terminal B.

In an embodiment, the first mirror transistor 334 is scaled with respect to the second mirror transistor 336 so that the magnitude of the current of the current sense signal CS equal to a multiple of the current flowing between the first terminal A and second terminal B. In embodiments, the multiple may an integer N greater than 1, and in other embodiments the multiple may be an integer fraction 1/N less than 1, but embodiments are not limited thereto.

In FIG. 3C, the first and second mirror transistors 334 and 336 are shown as NPN bipolar junction transistors (BJTs), but embodiments are not limited thereto. In embodiments, the first and second mirror transistors 334 and 336 may be PNP BJTs, n- or p-channel MOSFETs, n- or p-channel Junction FETs, and so on.

Figure 3D:
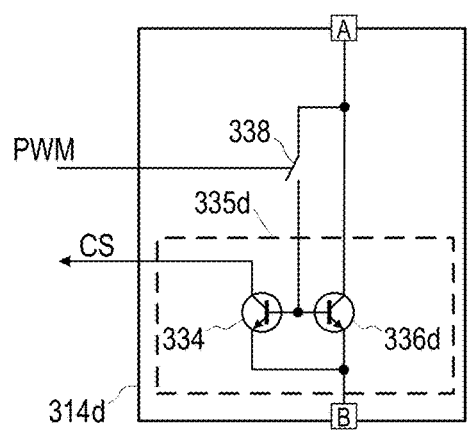
FIG. 3D illustrates a switch and current sense circuit according to another embodiment.

FIG. 3D illustrates a switch and current sense circuit 314d according to an embodiment. The switch and current sense circuit 314d is suitable for use in the switch and current sense circuit 214 of FIG. 2, and includes a switching device 338, a first mirror transistor 334, and a second mirror transistor 336d. In the switch and current sense circuit 314d, the second mirror transistor 336d both functions as part of current mirror 335d (like the second mirror transistor 336 of FIG. 3C) and controls the current flowing between a first terminal A and a second terminal B (like the MOSFET 330 of FIG. 3C).

The switching device 338 is coupled between the first terminal A and control terminals of the first and second mirror transistor 334 and 336d. When the switching device 338 is turned on by the PWM signal PWM, the second mirror transistor 336d turns on and allows the current to flow between the first terminal A and second terminal B. Also, when the switching device 338 is on, the first mirror transistor 334 produces a current sense signal CS having a current having a magnitude proportional to a magnitude of the current flowing between the first terminal A and second terminal B, as described with respect to FIG. 3C.

When the switching device 338 is turned off by the PWM signal PWM, the second mirror transistor 336d turns off and no current flows the first terminal A and second terminal B. When the switching device 338 is off, a magnitude of the current of the current sense signal CS is zero.

In an embodiment, the switching device 338 includes a MOSFET. In another embodiment, the switching device 338 includes a BJT. However, embodiments are not limited thereto.

Figure 4A:
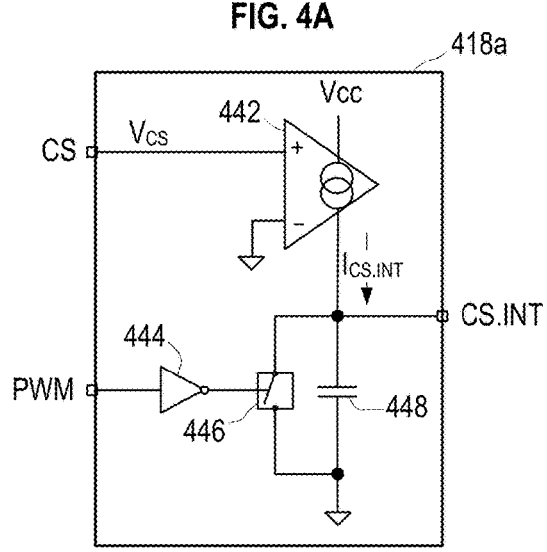
FIG. 4A illustrates a current sense integrator circuit according to an embodiment.

FIG. 4A illustrates a current sense integrator circuit (hereinafter, CS integrator) 418a according to an embodiment. The CS integrator 418a is suitable for use in the CS integrator 218 of FIG. 2, and includes a voltage-to-current (VI) converter 442, an inverter 444, a switching device 446, and a capacitor 448.

The VI converter 442 receives a current sense signal CS having a voltage having a magnitude corresponding to a sensed current, and produces an integration current $I_{CS.INT}$ proportional to the magnitude of the voltage of the current sense signal CS.

The inverter 444 receives a PWM signal PWM and produces a signal for operating the switching device 446. The switching device 446 is turned off when the PWM signal is asserted, and turned on when the PWM signal is de-asserted.

When the PWM signal PWM is de-asserted and the switching device 446 is turned on, a value of a voltage of an integrated CS signal CS.INT generated across the capacitor 448 is set to zero. When the PWM signal PWM is asserted and the switching device 446 is turned off, the value of the voltage of an integrated CS signal CS.INT generated across the capacitor 448 increases at a rate according to the integration current $I_{CS.INT}$.

As a result, while the PWM signal PWM is asserted, the magnitude of a voltage of the integrated CS signal CS.INT produces by the CS integrator 418a corresponds to the integral of the magnitude of the voltage of the current sense signal CS over the duration of the PWM signal PWM being asserted.

Figure 4B:
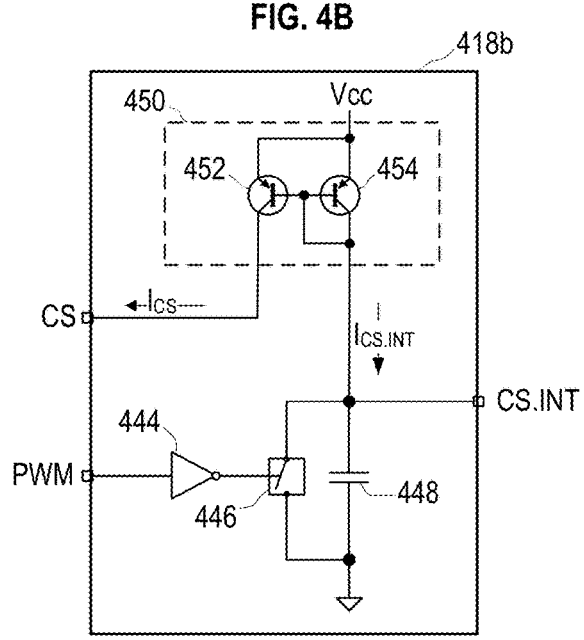
FIG. 4B illustrates a current sense integrator circuit according to another embodiment.

FIG. 4B illustrates a CS integrator 418b according to another embodiment. The CS integrator 418b is suitable for use in the CS integrator 218 of FIG. 2, and includes a first mirror transistor 452, a second mirror transistor 454, an inverter 444, a switching device 446, and a capacitor 448. The first and second mirror transistors 452 and 454 form a current mirror 450.

The current mirror 450 receives a current sense signal CS having a current having a magnitude corresponding to a sensed current, and produces an integration current $I_{CS.INT}$ proportional to the magnitude of the current of the current sense signal CS. In embodiments, the mirror output current $I_{CS.INT}$ may be a multiple of the current of the current sense signal CS, and the multiple may be 1, an integer N greater than 1, or an integer fraction 1/N less than 1, but embodiments are not limited thereto.

The inverter 444, switching device 446, and capacitor 448 operate as described for the corresponding elements in FIG. 3A. As a result, while the PWM signal PWM is asserted, a magnitude of a voltage of the integrated CS signal CS.INT produces by the CS integrator 418b corresponds to the integral of the magnitude of the current of the current sense signal CS over the duration of the PWM signal PWM being asserted.

Figure 4C:
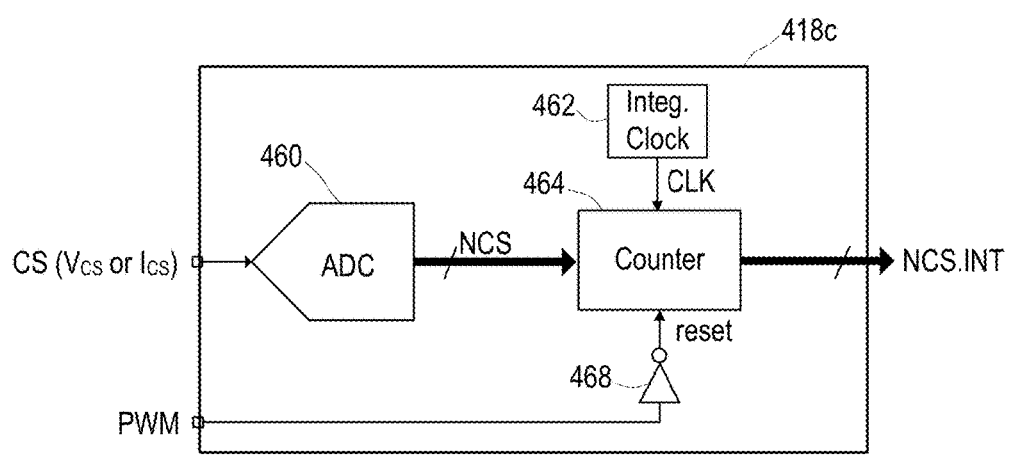
FIG. 4C illustrates a current sense integrator circuit according to another embodiment.

FIG. 4C illustrates a CS integrator 418c according to another embodiment. The CS integrator 418c is suitable for use in the CS integrator 218 of FIG. 2, and includes an Analog to Digital Converter circuit (hereinafter, ADC) 460, an integrator clock generator 462, a counter circuit 464, and an inverter 468.

The integrator clock generator 462 produces an integrator clock CLK. In an embodiment, a frequency of the integrator clock CLK corresponds to a conversion rate of the ADC 460.

In an embodiment, a frequency of the integrator clock CLK is substantially higher than a frequency of the PWM clock signal fPWM of FIG. 2. In an illustrative embodiment, the frequency of the integrator clock CLK may be 10 more times the frequency of the PWM clock signal fPWM, but embodiments are not limited thereto.

The ADC 460 receives a current sense signal CS and converts a magnitude of the current sense signal CS into a numerical current sense signal NCS. A value of numerical current sense signal NCS corresponds to the magnitude of the current sense signal CS and may be represented using a plurality of bits. A new value of the numerical current sense signal NCS may be generated for each cycle of the integrator clock CLK.

In an embodiment, the value of the numerical current sense signal NCS corresponds to a magnitude of a current $I_{CS}$ of the current sense signal CS. In an embodiment, the value of the numerical current sense signal NCS corresponds to a magnitude of a voltage $V_{CS}$ of the current sense signal CS.

The counter circuit 464 is reset to zero when the output of the inverter 468 is asserted; that is, when the PWM signal PWM is de-asserted. When the PWM signal PWM is asserted, the counter circuit 464 accumulates values of the numerical current sense signal NCS into an integrated numerical current sense signal NCS.INT by adding the present value of the numerical current sense signal NCS to the value of the integrated numerical current sense signal NCS.IN once for each cycle of the integrator clock CLK.

Figure 5A:
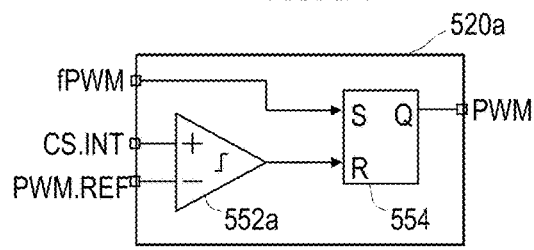
FIG. 5A illustrates a Pulse Width Modulation (PWM) circuit according to an embodiment.

FIG. 5A illustrates a Pulse Width Modulation (PWM) circuit 520a according to an embodiment. The PWM circuit 520a is suitable for use in the PWM circuit 220 of FIG. 2, and with either of the CS Integrator 418a of FIG. 4A or the CS Integrator 418b of FIG. 4B that produce analog integrated CS signals CS.INT. The PWM circuit 520a includes a comparator 552a and a Set-Reset Flip-Flop (SRFF) 554.

The comparator 552a receives the integrated CS signals CS.INT and a PWM reference signal PWM.REF. A magnitude of a voltage of the integrated CS signals CS.INT corresponds to an integral over time of a current. A magnitude of a voltage of PWM reference signal PWM.REF corresponds to a target average current. An output of the comparator 552a is asserted when the magnitude of the voltage of the integrated CS signals CS.INT is greater than the magnitude of the voltage of PWM reference signal PWM.REF, and is de-asserted otherwise.

The SRFF 554 receives the output of the comparator 552a on a reset input R and receives a PWM clock signal fPWM on a set input S. A PWM signal PWM is coupled to an output Q of the SRFF 554. The SRFF 554 asserts the PWM signal PWM in response to an assertion of the PWM clock signal fPWM, and de-asserts the PWM signal PWM in response to an assertion of the output of the comparator 552a.

The PWM circuit 520a operates using the SRFF 554, but embodiments are not limited thereto. For example, in an embodiment, a D-type flip-flop having a data input coupled to a logic-high value, a positive-edge triggered clock input receiving the PWM clock signal fPWM, a reset input receiving the output of the comparator 552a, and an output Q coupled to the PWM signal PWM could be used instead of the SRFF 554.

The PWM reference signal PWM.REF may be a fixed value, a configurable value, or may be controlled using a closed-loop control circuit, as will be described below.

Figure 5B:
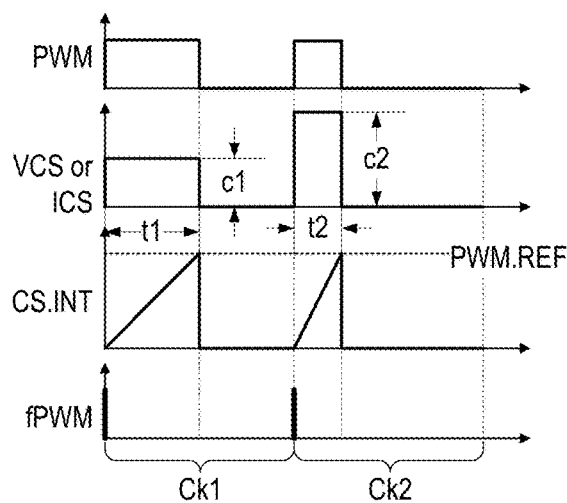
FIG. 5B illustrates signal waveforms during operation of the PWM circuit of FIG. 5A according to an embodiment.

FIG. 5B illustrates signal waveforms during operation of the PWM circuit 520a of FIG. 5A according to an embodiment, and includes the PWM signal PWM, the PWM clock signal fPWM, the integrated CS signal CS.INT, and a current sense signal VCS (having a voltage having a magnitude corresponding to a sensed current) or ICS (having a current having a magnitude corresponding to the sensed current), hereinafter referred to as current sense signal CS.

In response to the beginning of a first cycle Ck1 of the PWM clock signal fPWM, the PWM signal PWM is asserted and the sensed current is allowed to flow. During the first cycle Ck1, the current sense signal CS has a first magnitude c1, and the integrated CS signal CS.INT reaches the value of the PWM reference signal PWM.REF after a first time t1. In response to the integrated CS signal CS.INT being equal to or greater than the value of the PWM reference signal PWM.REF, the PWM signal PWM is de-asserted, and the sensed current no longer flows. The PWM signal PWM remains de-asserted for the remainder of the first cycle Ck1.

In response to the beginning of a second cycle Ck2 of the PWM clock signal fPWM, the PWM signal PWM is asserted and the sensed current is allowed to flow. During the second cycle Ck2, the current sense signal CS has a second magnitude c2, and the integrated CS signal CS.INT reaches the value of the PWM reference signal PWM.REF after a second time t2. In response to the integrated CS signal CS.INT being equal to or greater than the value of the PWM reference signal PWM.REF, the PWM signal PWM is de-asserted, and the sensed current no longer flows. The PWM signal PWM remains de-asserted for the remainder of the second cycle Ck2.

Because the slope of the integrated CS signal CS.INT is proportional to the magnitude of the sensed current, the first and second times t1 and t2 are inversely proportional to the first and second magnitudes c1 and c2, respectively: t1=k/c1 and t2=k/c2. Accordingly, $$\bar{I}_1 = t1 \times c1/C, \bar{I}_2 = t2 \times c2 \Big/ C \xrightarrow{yields} \bar{I}_1 = (k/c1) \times c1/C, \quad \text{Equation 1}$$

$$\bar{I}_2 = (k/c2) \times c2 \Big/ C \xrightarrow{yields} \bar{I}_1 = k/C,$$

$$\bar{I}_2 = k \Big/ C \xrightarrow{yields} \bar{I}_1 = \bar{I}_2$$

wherein $\bar{I}_1$ is an average current of the sensed current during the first cycle Ck1, I2 is an average current of the sensed current during the second cycle Ck2, k is a constant, and C is a duration of a cycle of the PWM clock signal fPWM.

Figure 5C:
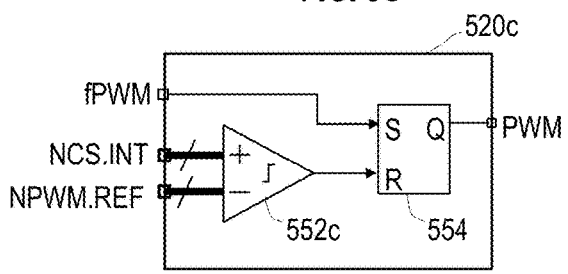
FIG. 5C illustrates a PWM circuit according to another embodiment.

FIG. 5C illustrates a PWM circuit 520c according to an embodiment. The PWM circuit 520c is suitable for use in the PWM circuit 220 of FIG. 2 with the CS Integrator 418c of FIG. 4C that produces a digital numerical integrated CS signal NCS.INT. The PWM circuit 520c includes a digital comparator 552c and a SRFF 554. The SRFF 554 operates as described for the SRFF 554 of FIG. 5A.

The digital comparator 552c receives an integrated numerical current sense signal NCS.INT and a numerical PWM reference signal NPWM.REF. The integrated numerical current sense signal NCS.INT may have been produced by, for example, the CS integrator 418c of FIG. 4C. An output of the digital comparator 552c is asserted when the value encoded by the integrated numerical current sense signals NCS.INT is equal to or greater than the value encoded by the a numerical PWM reference signal NPWM.REF, and is de-asserted otherwise.

The SRFF 554 receives the output of the comparator 552c on a reset input R and receives a PWM clock signal fPWM on a set input S, and operates as described for the SRFF 554 of FIG. 5A to produce the PWM signal PWM.

Figure 5D:
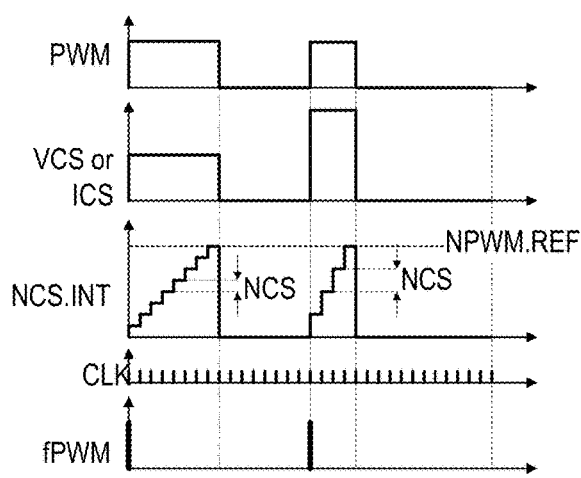
FIG. 5D illustrates signal waveforms during operation of the PWM circuit of FIG. 5C according to an embodiment.

FIG. 5D illustrates signal waveforms during operation of the PWM circuit 520c of FIG. 5C according to an embodiment, and includes the PWM signal PWM, the PWM clock signal fPWM, the integrated numerical CS signal NCS.INT, and a current sense signal VCS (having a voltage having a magnitude corresponding to a sensed current) or ICS (having a current having a magnitude corresponding to the sensed current), hereinafter referred to as current sense signal CS. FIG. 5D further includes the integrator clock signal CLK used to integrate a value of numerical current sense signal NCS to produce the integrated numerical CS signal NCS.INT.

Other than the discrete nature of the integrated numerical CS signal NCS.INT, FIG. 5D shows that the PWM circuit 520c of FIG. 5C operates in the same manner as described, relative to FIG. 5B, for the PWM circuit 520c of FIG. 5A.

Figure 6:
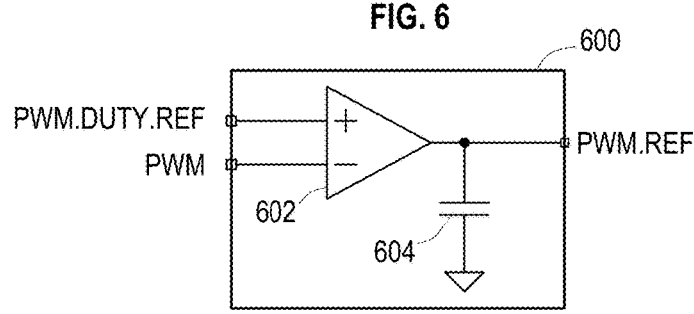
FIG. 6 illustrates a PWM reference signal generator according to an embodiment.

FIG. 6 illustrates a PWM reference signal generator 600 according to an embodiment. The output of the PWM reference signal generator 600 may provide the PWM reference signal PWM.REF to, for example, the PWM circuit 520a of FIG. 5A, or may be digitized by an Analog-to-Digital convert to supply a numerical PWM reference signal NPWM.REF to, for example, the PWM circuit 520c of FIG. 5C. The PWM reference voltage generator 600 includes a differential amplifier 602 and a capacitor 604.

In an embodiment, the differential amplifier 602 is a differential transconductance amplifier having an output current $I_{AO}=g_m \times (V_{PWM.DUTY.REF}-V_{PWM})$, wherein $g_m$ is the transconductance gain of the differential amplifier 602, $V_{PWM.DUTY.REF}$ is a voltage value of the PWM duty reference signal PWM.DUTY.REF, and $V_{PWM}$ is a voltage value of the PWM signal PWM when the PWM signal PWM is asserted, and the voltage value of the PWM signal PWM when the PWM signal PWM is de-asserted is equal to ground.

When $V_{PWM.DUTY.REF}$ is a fraction K Of $V_{PWM}$ (i.e., $V_{PWM.DUTY.REF}=K \times V_{PWM}$, 0<K<1), the average output current $\bar{I}_{AO}$ of the differential amplifier 602 over one PWM cycle=$g_m \times ((1-D) \times K \times V_{PWM}+D \times (K \times V_{PWM}-V_{PWM}))=g_m \times V_{PWM} \times ((1-D) \times K+D \times (K-1))=g_m \times V_{PWM} \times (K-D)$, wherein D is the duty cycle, 0<D<1, of the PWM signal PWM. As a result, when the duty cycle D is greater than the fraction K, the average output current $I_{AO}$ is negative and the voltage value of the PWM reference signal PWM.REF generated across the capacitor 604 decreases on average, when the duty cycle D if less than the fraction K, the average output current $I_{AO}$ is positive and the voltage value of the PWM reference signal PWM.REF increases on average, and when the duty cycle D is equal to the fraction K, the average output current $I_{AO}$ is zero and the voltage value of the PWM reference signal PWM.REF remains unchanged.

When an increase in PWM reference signal PWM.REF causes an increase in the average duty cycle of the PWM signal PWM (as in the PWM circuit 520a of FIG. 5A), the operation of the PWM reference signal generator 600 causes the duty cycle D of the PWM signal PWM to converge towards being equal to the fraction K. For example, if the fraction K is equal to 0.9, the duty cycle will be controlled to converge to 0.9 (90%).

In an embodiment, the fraction K is a fixed value. In another embodiment, the fraction K may be configured by, for example, an external signal or device or a programmable voltage divider, although embodiments are not limited thereto.

In another embodiment, the differential amplifier 602 has an output voltage $V_{AO}$ proportional to $V_{PWM.DUTY.REF}-V_{PWM}$ and a fixed output impedance so that the output impedance operates with the capacitor 604 to form an averaging circuit. This embodiment operates in essentially the same manner as described for the embodiment above wherein the differential amplifier 602 is a differential transconductance amplifier.

Figure 7A:
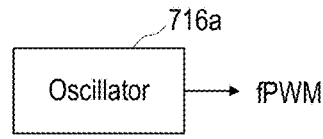
FIG. 7A illustrates a PWM clock generator circuit according to an embodiment.

FIG. 7A illustrates a PWM clock generator circuit 716a according to an embodiment, suitable for use in the PWM clock generator circuit 216 of FIG. 2. The PWM clock generator circuit 716a generates a PWM clock signal fPWM having a PWM frequency higher than a frequency that is harmful to the human eye. For example, the PWM frequency may be 2 KHz.

The PWM clock signal fPWM produced by the PWM clock generator circuit 716a is asynchronous to a frequency of a line voltage and is therefore asynchronous to a frequency of a ripple current caused by the line voltage.

In an embodiment, the PWM clock signal fPWM includes a short pulse (for example, a pulse having a duration of one microsecond or less) repeated at the PWM frequency.

Figure 7B:
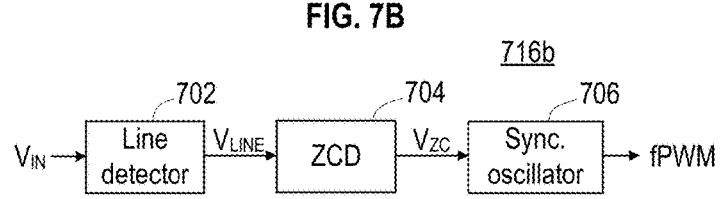
FIG. 7B illustrates a PWM clock generator circuit according to another embodiment.

FIG. 7B illustrates a PWM clock generator circuit 716b according to another embodiment, suitable for use in the PWM clock generator circuit 216 of FIG. 2. The PWM clock generator circuit 716b includes a line detector 702 to detect a line voltage $V_{LINE}$ corresponding to an input voltage $V_{IN}$, a zero crossing detector circuit 704 to produce a zero crossing signal $V_{ZC}$ indicating that the line voltage $V_{LINE}$ has a substantially zero magnitude, and a synchronous oscillator 706 to produce a PWM clock signal fPWM that is synchronized to a frequency of the input voltage $V_{IN}$ using the zero crossing signal $V_{ZC}$.

In an embodiment, a PWM frequency of the PWM clock signal fPWM is a multiple of the frequency of the input voltage $V_{IN}$. The multiple may be, for example, 40, so that when the frequency of the input voltage $V_{IN}$ is 50 Hz, the PWM frequency is 2 KHz.

Figure 7C:
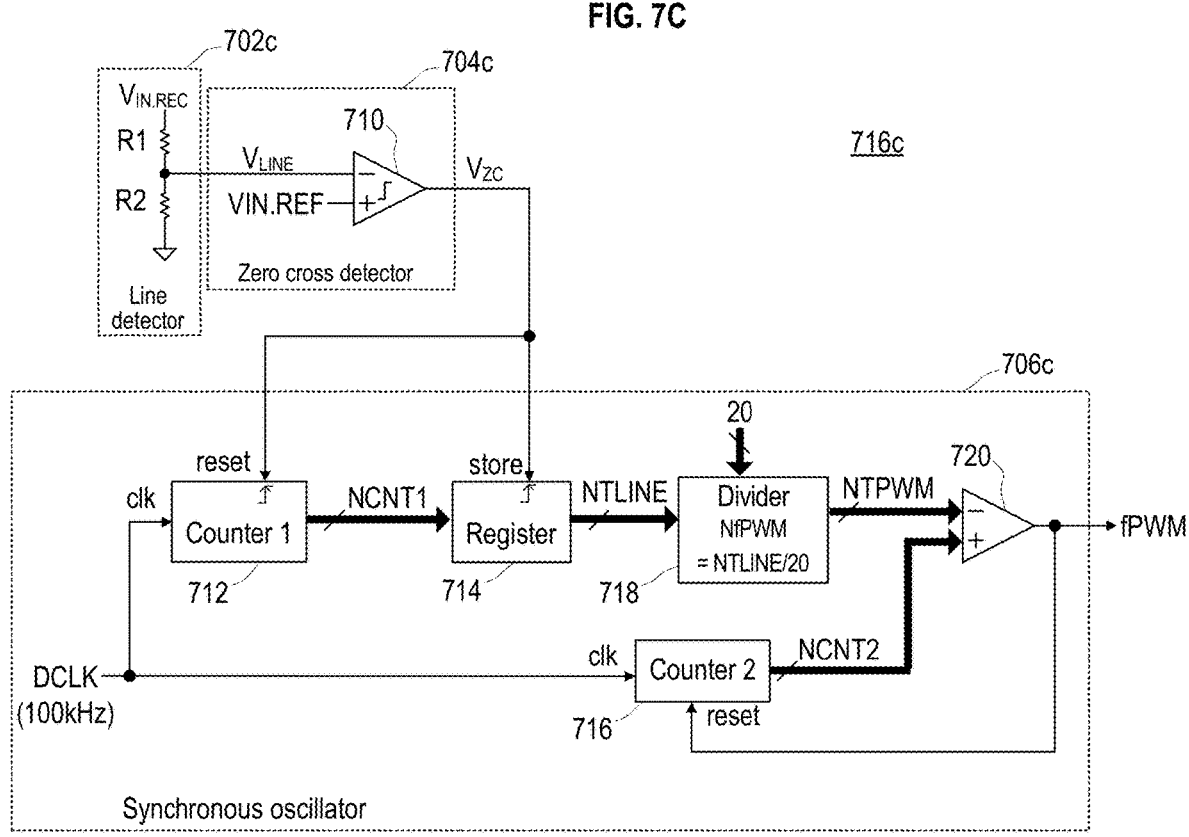
FIG. 7C illustrates a PWM clock generator circuit according to another embodiment.

FIG. 7C illustrates a PWM clock generator circuit 716c according to another embodiment, suitable for use as the PWM clock generator circuit 716b of FIG. 7B. The PWM clock generator circuit 716c includes a line detector 702c, a zero crossing detector circuit 704c, and a synchronous oscillator 706c.

The line detector 702c includes a voltage divider comprising a first resistor R1 and a second resistor R2. The voltage divider divides a magnitude of a rectified input voltage $V_{IN.REC}$ to produce a line voltage WINE.

When a magnitude of the rectified input voltage $V_{IN.REC}$ is close to 0 V, the line voltage $V_{LINE}$ drops below an input voltage reference value VIN.REF. When this occurs, a comparator 710 included in the zero crossing detector circuit 704c asserts a Zero Crossing Detect (ZCD) signal $V_{ZC}$, otherwise the comparator 710 de-asserts the ZCD signal $V_{ZC}$.

The synchronous oscillator 706c includes a first counter 712, a register 714, a second counter 716, a divider 718, and a digital comparator 720. The first counter 712 generates a clock count NCNT1 corresponding to a number of cycles of a digital clock DCLK to have occurred since the last rising edge of the ZCD signal $V_{ZC}$. In response to the rising edge of the ZCD signal $V_{ZC}$, a peak value of the clock count NCNT1 is stored in the register 714 and the first counter 712 is then reset to 0.

The divider 718 produces a target PWM clock count NTPWM by dividing the value stored in the register 714 by a constant, such as by 20 in the embodiment of FIG. 7C.

The second counter 716 counts the cycles of a digital clock DCLK until the value NCNT2 of the second counter 716 is greater than or equal to the target PWM clock count NTPWM. In response to the value NCNT2 of the second counter 716 being greater than or equal to the target PWM clock count NTPWM, the digital comparator 720 asserts the PWM clock signal fPWM. In response to the assertion of the PWM clock signal fPWM, the second counter 716 is reset to zero, which causes the de-assertion of the PWM clock signal fPWM.

Accordingly, the PWM clock generator circuit 716c generates a PWM clock signal fPWM that is synchronous to a frequency of the input voltage $V_{IN}$ and having a PWM frequency that is a multiple (here, 40, since the ZCD signal $V_{ZC}$ is asserted twice for each cycle of the input voltage $V_{IN}$) of the frequency of the input voltage $V_{IN}$.

Figure 8:
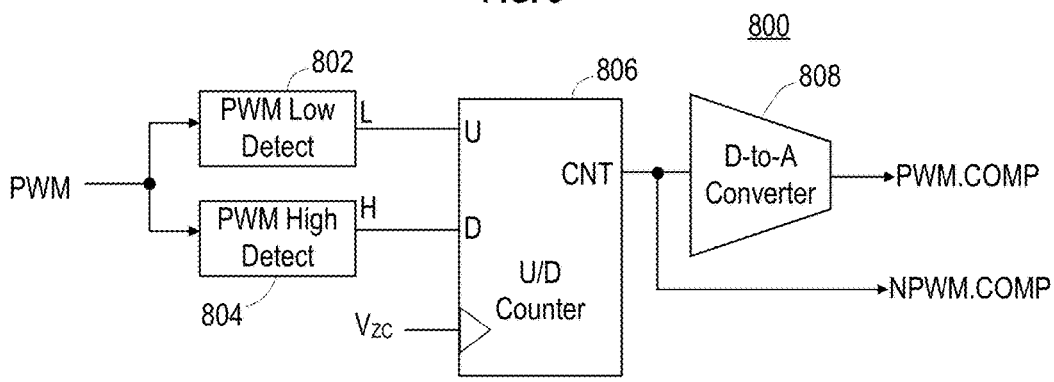
FIG. 8 illustrates a PWM duty compensator circuit according to an embodiment.

FIG. 8 illustrates a PWM compensator circuit 800 according to an embodiment, suitable for providing an analog PWM compensation signal PWM.COMP and/or a digital numerical PWM compensation signal NPWM.COMP. In an embodiment, the analog PWM compensation signal PWM.COMP or the digital numerical PWM compensation signal NPWM.COMP may be respectively used as the PWM duty reference signal PWM.DUTY.REF or the digital numerical PWM duty reference signal NPWM.DUTY.REF. In another embodiment, the analog PWM compensation signal PWM.COMP or the digital numerical PWM compensation signal NPWM.COMP may be respectively used to modify the PWM duty reference signal PWM.DUTY.REF or the digital numerical PWM duty reference signal NPWM.DUTY.REF. In an embodiment, the PWM reference signal PWM.REF may be controlled by the analog PWM compensation signal PWM.COMP or by the digital numerical PWM compensation signal NPWM.COMP.

The PWM compensator circuit 800 includes a PWM Low Limit Detect (LLD) circuit 802, a PWM High Limit Detection (HLD) circuit 804, an up-down counter 806, and an optional Digital-to-Analog Converter circuit (DAC) 808. The PWM compensator circuit 800 operates to maintain a duty cycle of the PWM signal PWM within a target range when the average magnitude of a current being regulated using the PWM signal PWM may vary substantially.

The PWM LLD circuit 802 determines whether a duty cycle of the PWM signal PWM goes below a low duty cycle threshold. Embodiments of the PWM LLD circuit 802 may make the determination in any of the ways listed below, but embodiments are not limited thereto.

In an illustrative embodiment, the PWM LLD circuit 802 determines whether a moving average of the duty cycle of the PWM signal PWM is below the low duty cycle threshold. For example, the PWM LLD circuit 802 may low-pass filter the PWM signal PWM and assert a low signal L when the output of the low-pass filter is less than the low duty cycle threshold (e.g., 50%).

In an illustrative embodiment, the PWM LLD circuit 802 determines whether an average of the duty cycle of the PWM signal PWM in a last measurement period (e.g., since the last rising edge of the ZCD signal $V_{ZC}$) is below the low duty cycle threshold. For example, the PWM LLD circuit 802 may integrate the PWM signal PWM over the measurement period and assert the low signal L when the output of the integrator is less than the low duty cycle threshold.

In an embodiment, the PWM LLD circuit 802 determines whether a minimum value of the duty cycle of the PWM signal PWM over the measurement period is below the low duty cycle threshold. For example, the PWM LLD circuit 802 may measure the duty cycle of each cycle of the PWM signal PWM since the last rising edge of the ZCD signal $V_{ZC}$ and assert the low signal L when one or more of the measured duty cycles was less than the low duty cycle threshold.

The PWM HLD circuit 804 determines whether a duty cycle of the PWM signal PWM goes above a high duty cycle threshold and asserts a high signal H accordingly. Embodiments of the PWM HLD circuit 804 may make the determination by any of determining whether a moving average of the duty cycle of the PWM signal PWM is above the high duty cycle threshold, determining whether an average of the duty cycle of the PWM signal PWM in a last measurement period is above the high duty cycle threshold, determining whether an maximum value of the duty cycle of the PWM signal PWM over the measurement period is equal to or greater than the high duty cycle threshold, or determining that a duty cycle of a cycle of the PWM signal PWM was 100% during the measurement period, but embodiments are not limited thereto. Embodiments of the PWM HLD circuit 804 may be implemented in manners similar to those described for the PWM LLD circuit 802 with the appropriate alterations.

The up-down counter 806 increases a count CNT in response to the low signal L being asserted when a rising edge of a clock (here, the ZCD signal $V_{ZC}$ derived from an input voltage such as is shown in FIG. 7C) occurs and decreases the count CNT in response to the high signal H being asserted when the rising edge of the clock occurs. In an embodiment, the up-down counter 806 leaves the count CNT unchanged if both the high signal H and the low signal L are asserted when the rising edge of the clock occurs.

The count CNT may be the numerical PWM compensation signal NPWM.COMP, and/or may be provided to the DAC 808 to produce the PWM compensation signal PWM.COMP, which may be used to generate, for example, the PWM duty reference signal PWM.DUTY.REF of FIG. 6.

Figure 9:
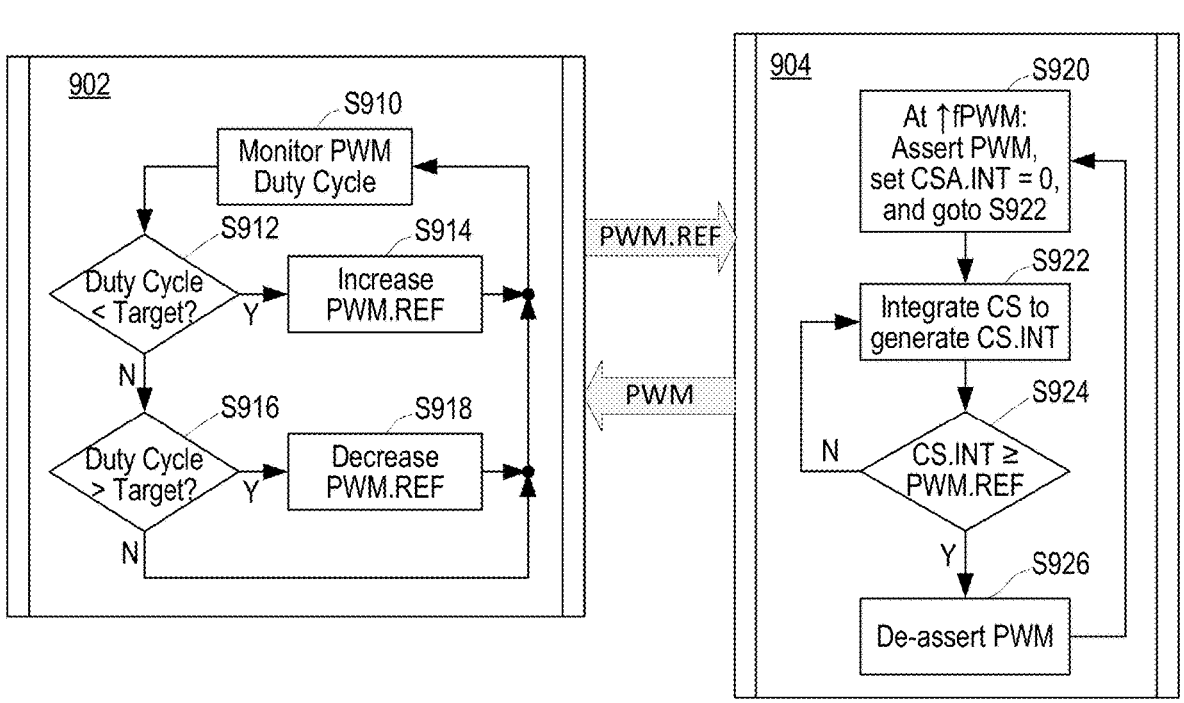
FIG. 9 illustrates a ripple reduction process according to an embodiment.

FIG. 9 illustrates a ripple reduction process 900 according to an embodiment. The ripple reduction process 900 may be performed by, for example, the ripple reduction circuit 210 of FIG. 2. The ripple reduction process 900 includes first and second subprocesses 902 and 904 which may be performed simultaneously.

The first subprocess 902 generates a PWM reference signal PWM.REF. The first subprocess 902 may be performed by, for example, the PWM reference signal generator 600 of FIG. 6.

At S910, the first subprocess 902 monitors a duty cycle of the PWM signal PWM.

At S912, the first subprocess 902 determines whether the duty cycle of the PWM signal PWM is less than a target duty cycle. In response to the duty cycle of the PWM signal PWM being less than the target duty cycle, the first subprocess 902 proceeds to S914; otherwise the first subprocess 902 proceeds to S916.

At S914, the first subprocess 902 increases a value of the PWM reference signal PWM.REF and then proceeds to S910.

At S916, the first subprocess 902 determines whether the duty cycle of the PWM signal PWM is greater than the target duty cycle. In response to the duty cycle of the PWM signal PWM being greater than the target duty cycle, the first subprocess 902 proceeds to S918; otherwise the first subprocess 902 proceeds to S916.

At S918, the first subprocess 902 decreases the value of the PWM reference signal PWM.REF and then proceeds to S910.

The second subprocess 904 generates the PWM signal PWM. The second subprocess 904 may be performed by, for example, the PWM signal generator 520a of FIG. 5A in conjunction with either the CS integrator 418a of FIG. 4A or the CS integrator 418b of FIG. 4B.

At S920, the second subprocess 904 waits for an assertion (i.e., a rising edge) of a PWM clock signal fPWM. In response to a rising edge of a PWM clock signal fPWM, the second subprocess 904 asserts the PWM signal PWM, resets a value of an integrated Current Sense (CS) signal CS.INT to zero, and then proceeds to S922. In embodiments, the PWM clock signal fPWM has a frequency of 2 KHz or of 40 times a frequency of a line voltage, but embodiments are not limited thereto.

At S922, the second subprocess 904 integrates a value of a CS signal CS into the value of the integrated CS signal CS.INT.

At S924, the second subprocess 904 compares the integrated CS signal CS.INT to the PWM reference signal PWM.REF. In response to the value of the integrated CS signal CS.INT being greater than or equal to the value of the PWM reference signal PWM.REF, the second subprocess 904 proceeds to S926; otherwise, the second subprocess 904 proceeds to S922 to continue integrating the CS signal CS into the integrated CS signal CS.INT.

At S925, the second subprocess 904 de-asserts the PWM signal PWM. The second subprocess 904 then proceeds to S920.

Figure 10A:
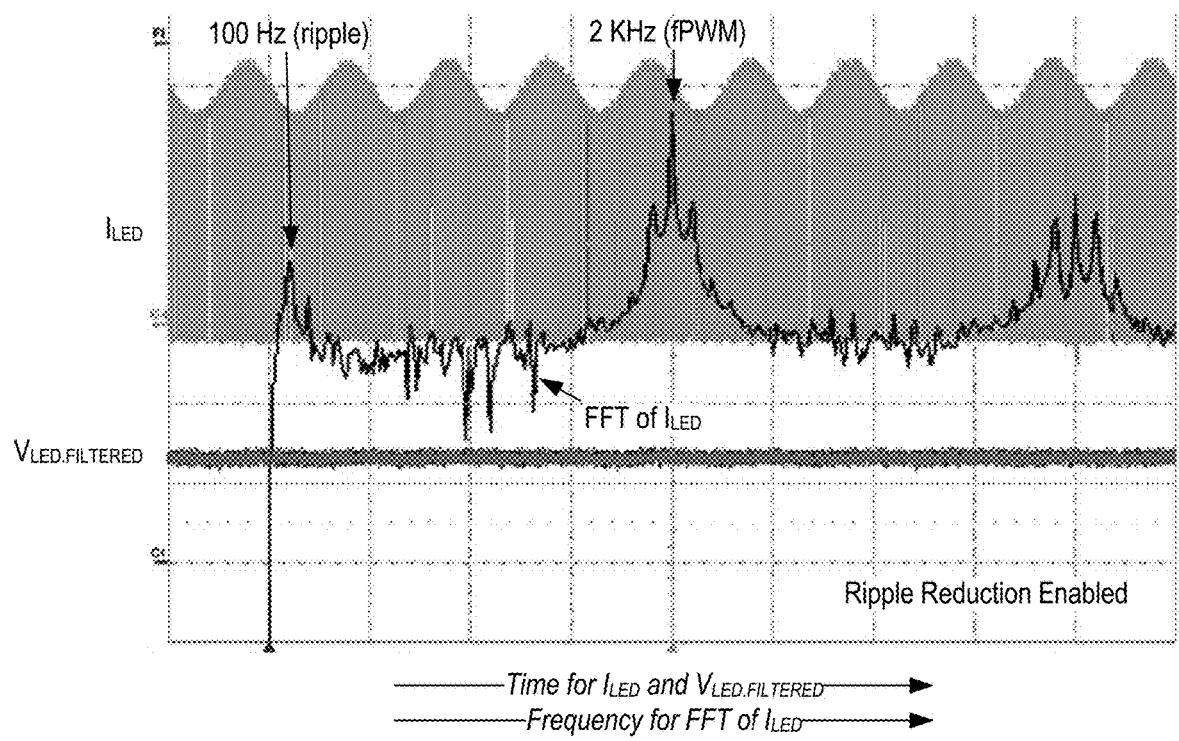
FIG. 10A illustrates signal waveforms of an LED circuit wherein ripple reduction according to an embodiment is enabled.

FIG. 10A illustrates signal waveforms of an LED circuit wherein ripple reduction according to an embodiment is enabled. Waveforms illustrated in FIG. 10A include an LED current $I_{LED}$ plotted versus time, a filtered LED voltage $V_{LED}$ FILTERED plotted versus time, and a result of a Fast Fourier Transform (FFT) of the LED current $I_{LED}$ plotted versus frequency.

Figure 10B:
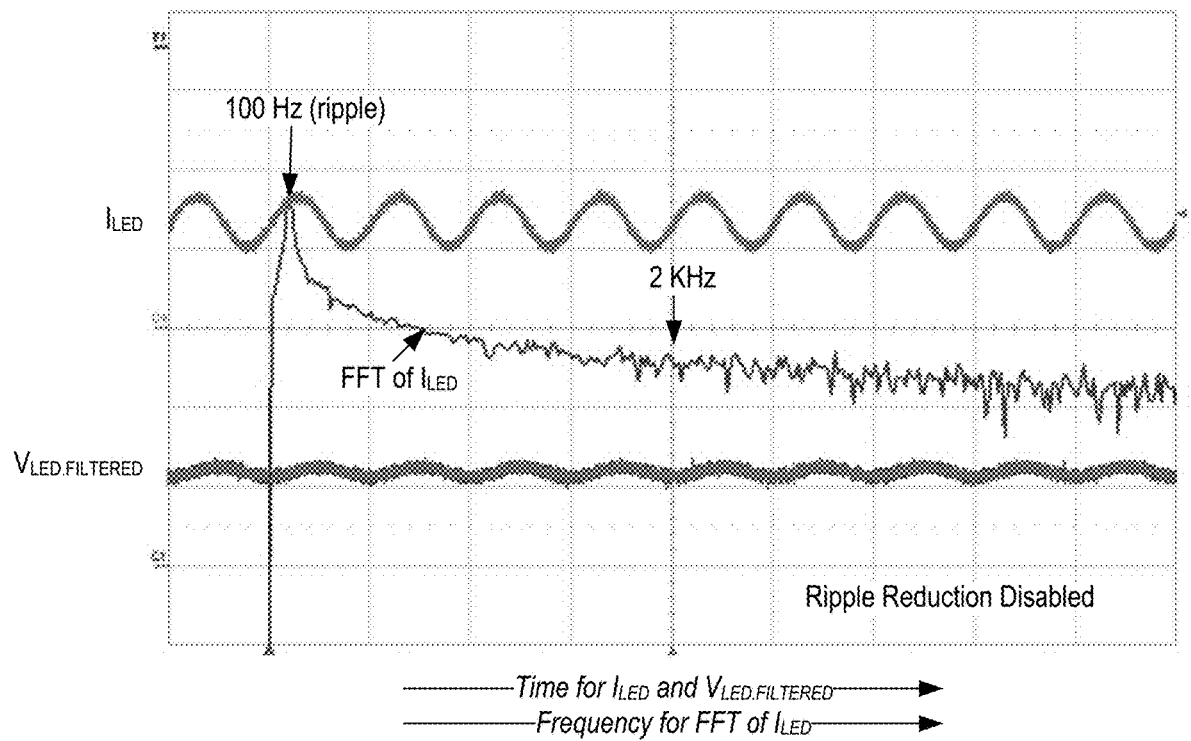
FIG. 10B illustrates signal waveforms of an LED circuit wherein ripple reduction according to an embodiment is disabled.

FIG. 10B illustrates signal waveforms of the LED circuit wherein ripple reduction according to an embodiment is disabled, and includes the same waveforms illustrated in FIG. 10A.

As can be seen in comparing FIG. 10A to FIG. 10B, the fraction of the current flowing in the LEDs in the frequencies that may, when expressed in the light emitted by the LEDs, be deleterious to the human eye (that is, frequencies below the PWM frequency fPWM) is reduced when the ripple reduction of an embodiment is enabled. In particular, a magnitude of a ripple current at a ripple frequency that is a second harmonic of an AC mains line frequency (here, 100 Hz) is reduced when the ripple reduction of an embodiment is enabled.

The circuits and processes according to embodiments reduce a variation (e.g., ripple) in a light output of device including an LED circuit in frequencies that may have deleterious effects on the human eye by performing Pulse Width Modulation (PWM) of the current flowing in the LED circuit. The PWM is performed at a frequency higher than the frequencies that may have deleterious effects on the human eye. Embodiments reduce the ripple in the deleterious frequencies efficiently and without a large increase in the cost of manufacturing the device.

Embodiments of the present disclosure include electronic devices, e.g., one or more packaged semiconductor devices, configured to perform one or more of the operations described herein. However, embodiments are not limited thereto.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined. The order of operations described in embodiments is illustrative and may be re-ordered unless otherwise constrained. Further, features of two or more embodiments may be combined to form a new embodiment.

What is claimed is:

1. A circuit comprising:
   a power supply circuit to supply a lighting current to a light emitting circuit, the lighting current having a ripple current at a ripple frequency; and
   a ripple reduction circuit to:
   receive the lighting current flowing through the light emitting circuit,
   monitor the received lighting current, and
   perform, based on the received lighting current, Pulse Width Modulation (PWM) of the received lighting current at a PWM frequency to reduce variations in a magnitude of the lighting current at the ripple frequency by performing the PWM,
   wherein the PWM frequency is higher than the ripple frequency.

2. The circuit of claim 1, wherein the PWM frequency is a frequency higher than a frequency at which variations in the magnitude of the light produced by the lighting circuit have a harmful effect on the human eye.

3. The circuit of claim 1, wherein the ripple reduction circuit comprises:
   a switching device through which the lighting current flows,
   wherein the ripple reduction circuit performing PWM of the lighting current includes controlling a duration of an on time of the switching device.

4. The circuit of claim 1, wherein the light emitting circuit includes a Light Emitting Diode.

5. The circuit of claim 1, wherein the ripple reduction circuit is to control a duty cycle of the PWM in a first cycle of the PWM frequency so that an average magnitude of the lighting current during the first cycle is equal to the average magnitude of the lighting current during a second cycle of the PWM frequency, the second cycle immediately preceding the first cycle.

6. The circuit of claim 1, wherein the ripple reduction circuit is to control a duty cycle of the PWM in each cycle of the PWM frequency so that an integral of a magnitude of the lighting current during each cycle is equal to a PWM reference value.

7. The circuit of claim 6, wherein the PWM reference value is determined according to a target duty cycle of the PWM.

8. The circuit of claim 7, wherein the target duty cycle of the PWM is determined according to a PWM low threshold, a PWM high threshold, or both.

9. A circuit comprising:
   a ripple reduction circuit to receive a lighting current flowing through a light emitting circuit, the lighting current having a ripple current, the ripple current having a ripple frequency, the ripple reduction circuit comprising:
   a switching device to control the lighting current according to a Pulse Width Modulation (PWM) signal,
   a Current Sense (CS) circuit to produce a CS signal according to a magnitude of the lighting current,
   a CS integrator to generate, by integrating the CS signal over a duration, an integrated CS signal, and a PWM signal generation circuit to generate, according to a PWM clock signal and the integrated CS signal, the PWM signal, wherein the ripple reduction circuit operates to reduce a magnitude of the ripple current at the ripple frequency.

10. The circuit claim 9, further comprising:

a power supply circuit to supply a lighting current to the light emitting circuit, the lighting current being a current having the ripple current.

11. The circuit of claim 9, wherein the PWM signal generation circuit comprises:

a comparator having an output indicating whether a value of the integrated CS signal is greater than a value of a PWM reference signal; and a flip-flop circuit to assert the PWM signal in response to the beginning of a cycle of the PWM clock signal and to de-assert the PWM signal according to the output of the comparator.

12. The circuit of claim 11, wherein the ripple reduction circuit further comprises a PWM reference signal generator circuit to generate the PWM reference signal according to a PWM duty reference signal, the PWM duty reference signal corresponding to a target duty cycle of the PWM signal.

13. The circuit of claim 12, wherein the ripple reduction circuit further comprises a PWM compensator circuit to control the PWM duty reference signal by comparing the PWM signal to a low duty cycle threshold, a high duty cycle threshold, or both.

14. The circuit of claim 9, further comprising an oscillator circuit to generate the PWM clock signal as an integer multiple of the ripple frequency.

15. The circuit of claim 9, wherein the light emitting circuit comprises a Light Emitting Diode (LED) to produce visible light according to the lighting current.

16. A method for reducing an effect of a ripple current having a ripple frequency in a power supply current, the method comprising:

performing, using a clock signal, Pulse Width Modulation (PWM) of the power supply current so that an average current during a cycle of the clock signal is equal to a target value, wherein a frequency of the clock signal is greater than the ripple frequency, and wherein the power supply current is a current through a light emitting circuit.

17. The method of claim 16, wherein the ripple frequency corresponds to a frequency of an Alternating Current mains line voltage.

18. The method of claim 16, wherein performing PWM of the power supply current comprises:

turning on a switching device controlling the power supply current in response to a beginning of the cycle;

integrating, during the cycle, a value corresponding to a magnitude of the power supply current to produce an integrated current signal;

determining whether a value of the integrated current signal is greater than or equal to a reference value; and turning off the switching device in response to determining that the value of the integrated current signal is greater than or equal to the reference value.

19. The method of claim 18, further comprising:

increasing the reference value in response to a duty cycle of the switching device being less than a target duty cycle value; and decreasing the reference value in response to a duty cycle of the switching device being greater than the target duty cycle value.

20. The method of claim 19, further comprising:

increasing the target duty cycle value according to a comparison of the duty cycle of the switching device to a low duty cycle threshold; and decreasing the target duty cycle value according to a comparison of the duty cycle of the switching device to a high duty cycle threshold.

\* \* \* \* \*